US012808431B2

(12) United States Patent
Triebold

(10) Patent No.: US 12,808,431 B2
(45) Date of Patent: Nov. 24, 2026

(54) PARALLEL AXIS FRICTION DRAG BRAKE

(71) Applicant: Reell Precision Manufacturing Corporation, St. Paul, MN (US)

(72) Inventor: Allan Triebold, Cottage Grove, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 19/081,800

(22) Filed: Mar. 17, 2025

(65) Prior Publication Data

US 2025/0215961 A1 Jul. 3, 2025

Related U.S. Application Data

(62) Division of application No. 18/277,750, filed as application No. PCT/US2022/017378 on Feb. 22, 2022, now abandoned.

(60) Provisional application No. 63/151,885, filed on Feb. 22, 2021.

(51) Int. Cl.

| | |
|---|---|
| ***F16H 25/24*** | (2006.01) |
| ***F16D 59/00*** | (2006.01) |
| ***F16H 19/08*** | (2006.01) |
| *E05F 15/622* | (2015.01) |
| *E05F 15/63* | (2015.01) |
| *F16H 25/20* | (2006.01) |

(52) U.S. Cl.

CPC ......... *F16H 25/2454* (2013.01); *F16D 59/00* (2013.01); *F16H 19/08* (2013.01); *E05F 15/622* (2015.01); *E05F 15/63* (2015.01); *E05Y 2201/21* (2013.01); *E05Y 2201/216* (2013.01); *E05Y 2201/26* (2013.01); *E05Y 2201/716* (2013.01); *E05Y 2900/546* (2013.01); *F16H 2025/2071* (2013.01); *F16H 2025/2075* (2013.01)

(58) Field of Classification Search

CPC .......... F16H 25/2454; F16H 2025/2071; E05F 16/622

See application file for complete search history.

(56) References Cited

U.S. PATENT DOCUMENTS

| | | | |
|---|---|---|---|
| 5,697,125 | A | 12/1997 | Gannon |
| RE37,712 | E | 5/2002 | Gannon |
| 6,530,123 | B1 | 3/2003 | Wahlstedt |
| 6,927,513 | B2 | 8/2005 | Schreier |
| 9,835,214 | B2 | 12/2017 | Son et al. |

(Continued)

FOREIGN PATENT DOCUMENTS

| | | |
|---|---|---|
| DE | 10 2017 101 325 | 7/2018 |
| DE | 10 2018 131 966 | 6/2020 |

(Continued)

*Primary Examiner* — Gregory Robert Weber

(74) *Attorney, Agent, or Firm* — DBC Law Group, PLLC

(57) ABSTRACT

One aspect is an actuator system having a rotatable drive shaft and a parallel axis friction brake engaged with the drive shaft and configured to provide a drag force on the rotatable drive shaft. The parallel axis friction brake further includes a brake housing and a friction assembly that has at least one parallel axis shaft and at least one clip pressed over the at least one parallel shaft in an interference fit. The friction assembly is engaged with the drive shaft and coupled to the brake housing, at least a portion of the friction assembly rotating with the rotatable drive shaft to create the drag force.

16 Claims, 23 Drawing Sheets

(56) References Cited

U.S. PATENT DOCUMENTS

| | | | |
|---|---|---|---|
| 10,112,578 | B2 | 10/2018 | Lehmeier et al. |
| 10,208,844 | B2 | 2/2019 | Ritter et al. |
| 10,273,737 | B2 | 4/2019 | Mueller et al. |
| 10,605,347 | B2 | 3/2020 | Larson |
| 10,883,300 | B2 | 1/2021 | Wittelsbuerger et al. |
| 11,199,039 | B2 | 12/2021 | Zander |
| 2002/0007996 | A1 | 1/2002 | Larson |
| 2017/0074382 | A1 | 3/2017 | Larson |
| 2017/0340103 | A1 | 11/2017 | Happich et al. |
| 2020/0165856 | A1 | 5/2020 | Scheuring et al. |
| 2020/0181967 | A1 | 6/2020 | Schweizer et al. |
| 2020/0332585 | A1 | 10/2020 | Kummer et al. |
| 2021/0017795 | A1 | 1/2021 | Grenouillat et al. |
| 2021/0054889 | A1 | 2/2021 | Bals et al. |
| 2021/0180385 | A1 | 6/2021 | Wolf et al. |
| 2022/0136294 | A1 | 5/2022 | Scheuring et al. |
| 2022/0228634 | A1 | 7/2022 | Reif et al. |
| 2024/0229907 | A1 | 7/2024 | Triebold |

FOREIGN PATENT DOCUMENTS

| | | | | |
|---|---|---|---|---|
| EP | 2 202 377 | | 6/2010 | |
| EP | 2202377 | A2 * | 6/2010 | .............. E05F 15/63 |
| JP | S55-098094 | | 7/1980 | |
| JP | S61-206942 | | 9/1986 | |
| JP | 2008-151232 | | 7/2008 | |
| JP | 2017-223110 | | 12/2017 | |
| JP | 2021-014898 | | 2/2021 | |
| WO | 2009/059747 | | 5/2009 | |
| WO | 2013/176189 | | 11/2013 | |
| WO | 2019/192772 | | 10/2019 | |

* cited by examiner

PARALLEL AXIS FRICTION DRAG BRAKE

CROSS-REFERENCE TO RELATED APPLICATION

This Utility Patent Application is a divisional application of U.S. patent application Ser. No. 18/277,750, filed Aug. 17, 2023, which claims priority under 35 U.S.C. § 371 to International Application Serial No. PCT/US2022/017378, filed Feb. 22, 2022, which claims priority to U.S. Patent Application No. 63/151,885, filed Feb. 22, 2021; all of which are incorporated herein by reference in their entirety.

BACKGROUND

Adding drag is desired or required for many mechanical systems. One common application is automotive closure drive systems—where an electric motor drives the opening and closing of a tailgate, door or rear hatch. During manual use, added drag is needed to compensate for variables that cannot be negated with potential counterbalancing of the hatch or gate (parking on slopes, snow load and other added loads). However, during powered moves of these doors/gates it is desired to have minimal drag that the motor must drive through. To maintain efficiency there is a need for precise control of the drag added to the system. This precise drag torque must be maintained over the life of the actuator including the full temperature and speed range seen during use. Additionally, these automotive closure applications are very sensitive to stick-slip. If the stick-slip occurs, then the user feel while moving the gate manually becomes very erratic and objectionable. For many applications there are also restrictions on diameter and allowed length that further limit brake options.

There are several ways known in the art to create drag, such as friction discs, wrap springs, magnetic hysteresis and others. Several of these suffer from stick-slip issues, wear and torque degradation over life, temperature dependence of torque, and low torque density. Some have added different materials for solutions, such as carbon fiber elements, but adding components adds to costs and complicates designs.

The inventor has also researched friction clip devices for drag brakes, but stick-slip could not be avoided in normal applications. Because the clip friction device consumes a smaller footprint and is relatively simple it remains an attractive way to create a drag brake within electromechanical actuators. However, the stick-slip problem must be solved and thus a need for further invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as “top,” “bottom,” “front,” “back,” “leading,” “trailing,” etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1:
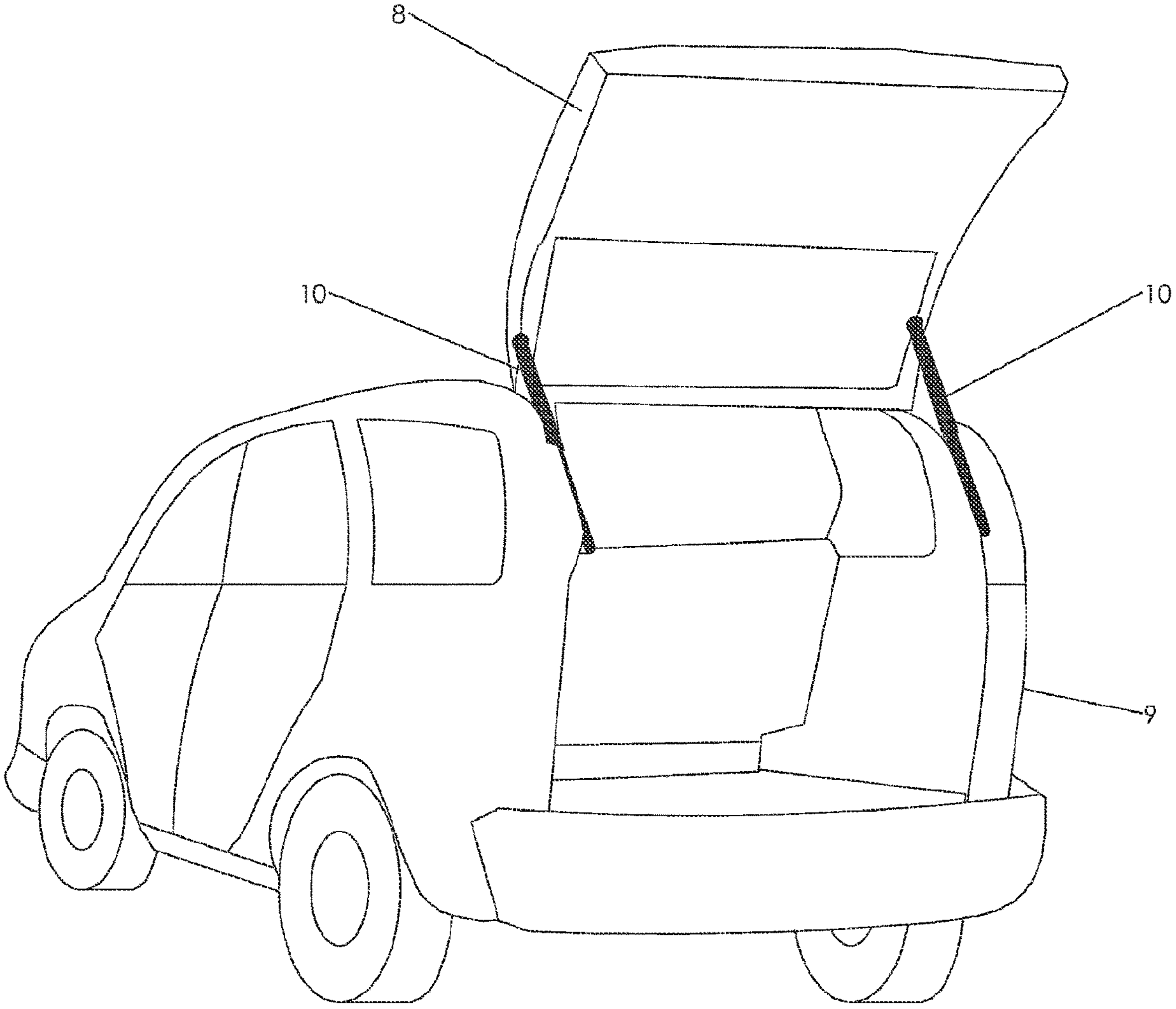
FIG. 1 illustrates a power actuator system in accordance with one embodiment.

FIG. 1 illustrates a power actuator system 10 in accordance with one embodiment. In one embodiment, power actuator system 10 is an automotive closure drive system that drives the opening and closing of a tailgate 8, relative to a vehicle or automobile 9. In such an arrangement, it is advantageous for additional drag to be provided in order to compensate for variables that cannot be negated with potential counterbalancing of the gate 8, such as when the vehicle is parking on a slope, when there is a snow load on the gate 8, and so on. During a powered move of gate 8, while there needs to be minimal drag on the motor, there is also a need for precise control of the drag on the system in order to maintain efficiency. This precise drag torque must be maintained over the life of the actuator including the full temperature and speed range seen during use. Power actuator system 10 may be used to control the movement of a variety of movable components relative to the stationary vehicle, such as side doors, rear hatches, front hoods, windows, power side steps, and air dams.

There are a variety of mechanisms that have been employed for providing drag within power actuator system 10. Such mechanisms include, friction discs, wrap springs, magnetic hysteresis and others. Such mechanisms can be complex, occupy a large amount of space, and fail to provide precise control of the drag on the system.

Figure 2:
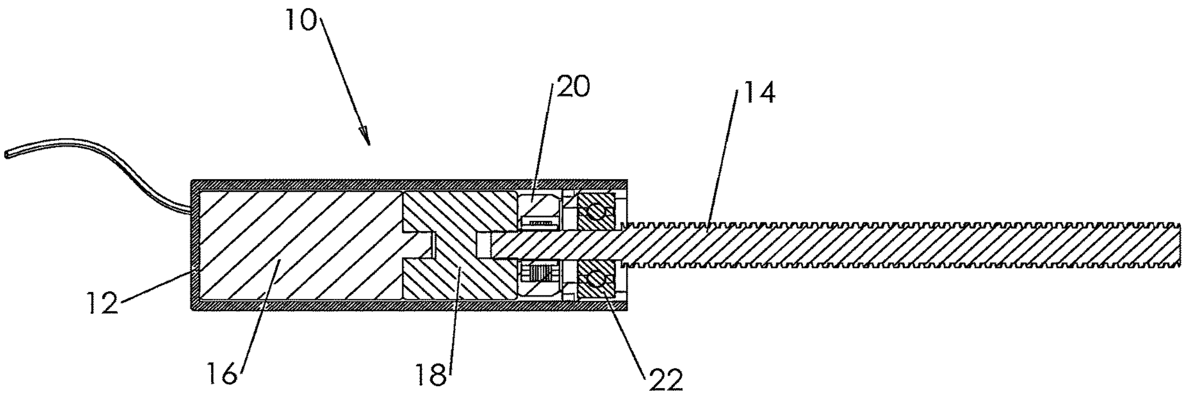
FIG. 2 illustrates a power actuator system 10 incorporating a friction brake in accordance with one embodiment.

FIG. 2 illustrates a power actuator system 10 incorporating a friction brake 20 in accordance with one example. In one example, power actuator system 10 includes actuator housing 12, output screw 14, motor 16, gearbox 18, friction brake 20 and bearing support 22. In operation, actuator housing 12 is configured as a relatively long and narrow tubular device that is attached between a gate and a frame, such as an automobile tailgate 8 and an automobile 9 in FIG. 1, and power actuator system 10 opens and closes the gate 8. Motor 16 provides power to gearbox 18, which then drives output screw 14 in clockwise and counterclockwise directions to alternatively open and close a gate to which it is attached. Friction brake 20 is coupled over output screw 14 to provide a drag torque on its rotation.

Figure 3A:
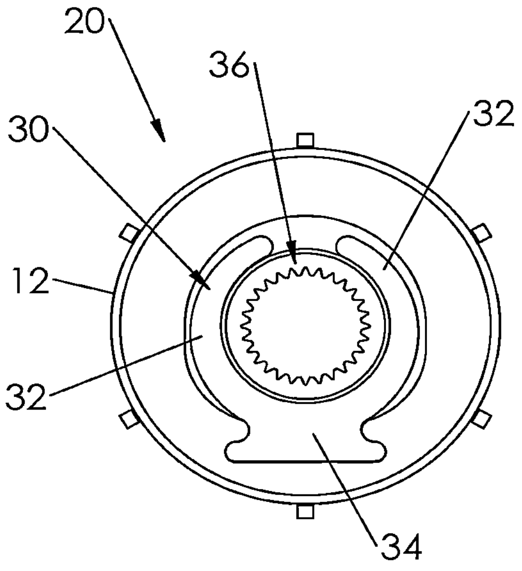
FIGS. 3A-3B illustrate a friction brake in accordance with one embodiment.
Figure 3B:
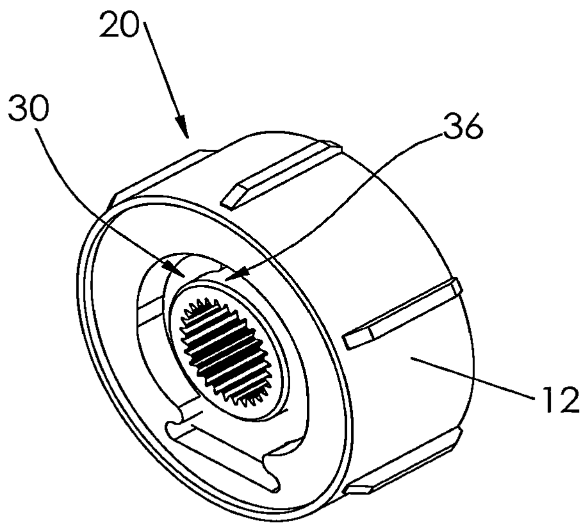

FIG. 3 illustrates further detailed views of friction brake 20. Friction brake 20 includes clips 30 and hollow shaft 36. Clips 30 include base 34 and arms 32. Base 34 is configured to fit into a slot portion of actuator housing 12, such that relative movement between clips 30 and actuator housing 12 is prevented. Hollow shaft 36 has an inner surface configured with teeth to engage output screw 14 and rotate with it. Hollow shaft 36 is fixed within the arms 32 of clips 30 in an interference fit. As hollow shaft 36 rotates within the arms 32 of clips 30, the interference fit provides a drag torque.

The inventor found that friction brake 20 is able to meet the precise torque requirements over the required life with relatively low variation due to temperature. It also offers a reasonably small length footprint and are simple enough to be cost competitive. However, the inventor further found that friction brake 20 consistently produced an undesirable amount of stick-slip, which cannot be avoided.

Figure 4:
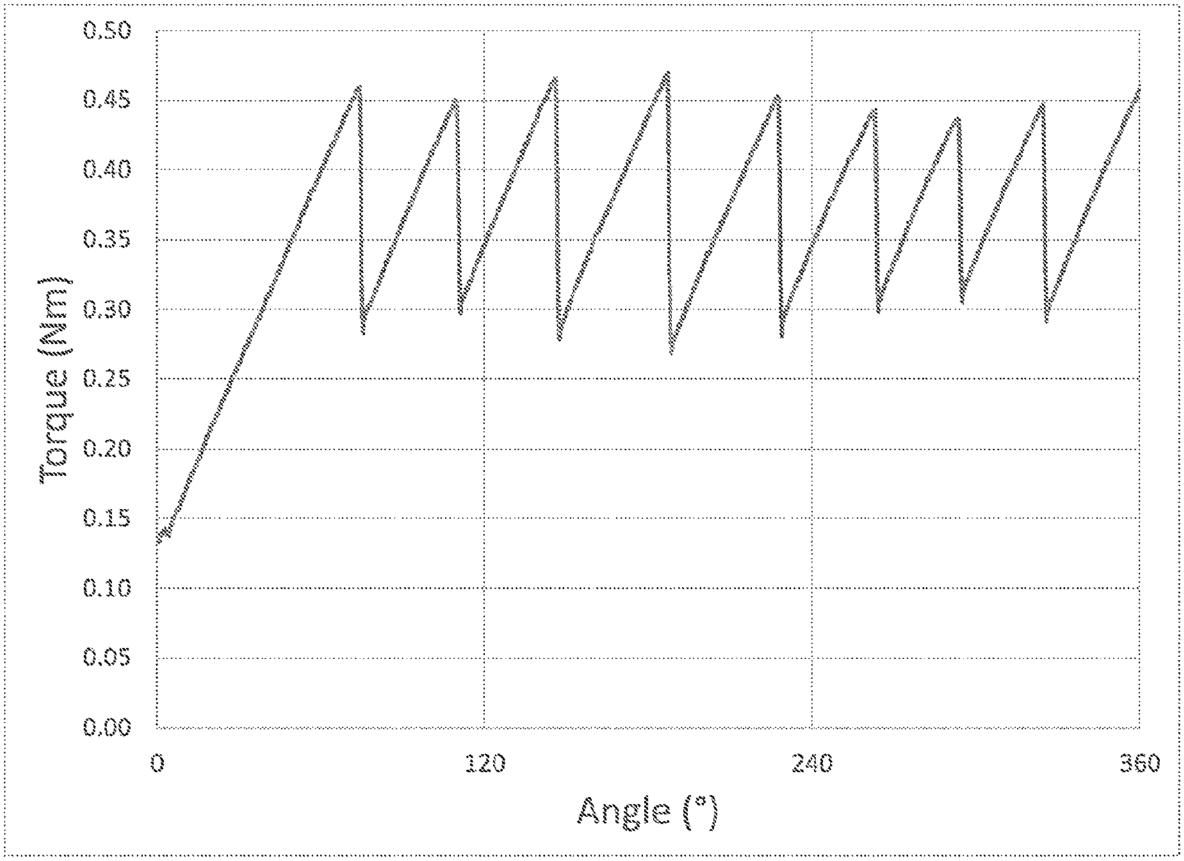
FIG. 4 illustrates torque produced as a function of angle for a friction brake.

FIG. 4 illustrates the torque produced in friction brake 20 as a function of angle as hollow shaft 36 and output screw 14 rotate. A test system was developed to test torque produced in friction brake 20 as a function of angle as hollow shaft 36 and output screw 14 rotate, the test system including the addition of a compliant element with a relatively large rotary inertial load. At the beginning of the test, the compliant element is loaded up to the static torque of the friction brake 20 under test with no relative motion of the brake. Then once the static torque is met relative motion starts. In this case due to the characteristics and performance of the brake, it rotates quickly for a short amount of time—the nearly vertical line going down in FIG. 4. Due to the inertia within the system and the compliant member's stored energy the brake device will over travel before coming to a stop. Then the motor will begin the cycle again by loading up the compliant member without movement of the brake. This torque behavior of the friction brake as a result of the brake performance characteristic, system inertia and system spring rate produces the choppy, saw tooth, torque output known as stick-slip.

This is an undesirable output characteristic for a power actuator system, such as used for opening and closing a tailgate or door. Additionally, many automotive closure applications are very sensitive to stick-slip. When stick-slip us present, the user feel while moving the gate manually becomes very erratic and objectionable. For many applications there are also restrictions on diameter and allowed length that further limit brake options.

Figure 5A:
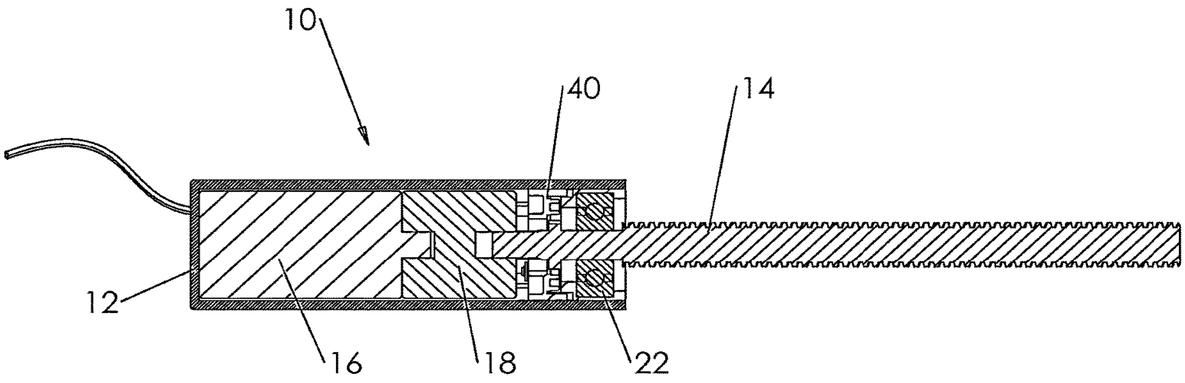
FIGS. 5A-5B illustrate a power actuator system incorporating a parallel axis friction brake in accordance with one embodiment.

FIG. 5A illustrates a cross-sectional view a power actuator system 10 incorporating a parallel axis friction brake 40 in accordance with one embodiment. In FIG. 5A, parallel axis friction brake 40 is substituted in for friction brake 20. In one embodiment, power actuator system 10 includes actuator housing 12, output screw 14, motor 16, gearbox 18 parallel axis friction brake 40 and bearing support 22. In one embodiment, power actuator system 10 drives the opening and closing of a tailgate 8, relative to an automobile 9, as illustrated in FIG. 1.

In operation, actuator housing 12 is configured as a relatively long and narrow tubular device that is attached between tailgate 8 and automobile 9, and power actuator system 10 opens and closes gate 8. Motor 16 provides power to gearbox 18, which then drives output screw 14 in clockwise and counterclockwise directions to alternatively open and close gate 8 to which it is attached. Parallel axis friction brake 40 is coupled over output screw 14 to provide a drag torque on its rotation.

The inventor surprisingly found that even though parallel axis friction brake 40 creates higher pressure than does friction brake 20 above, it greatly improves stick-slip performance. This could not be anticipated. Temperature impact is also surprisingly improved. Because higher pressure is counterproductive for the long-life requirements, successful use of parallel axis friction brake 40 in a power actuator system 10 was not expected. However, the smaller diameter featured in parallel axis friction brake 40 means less travel per revolution compared to the friction brake 20.

Figure 5B:
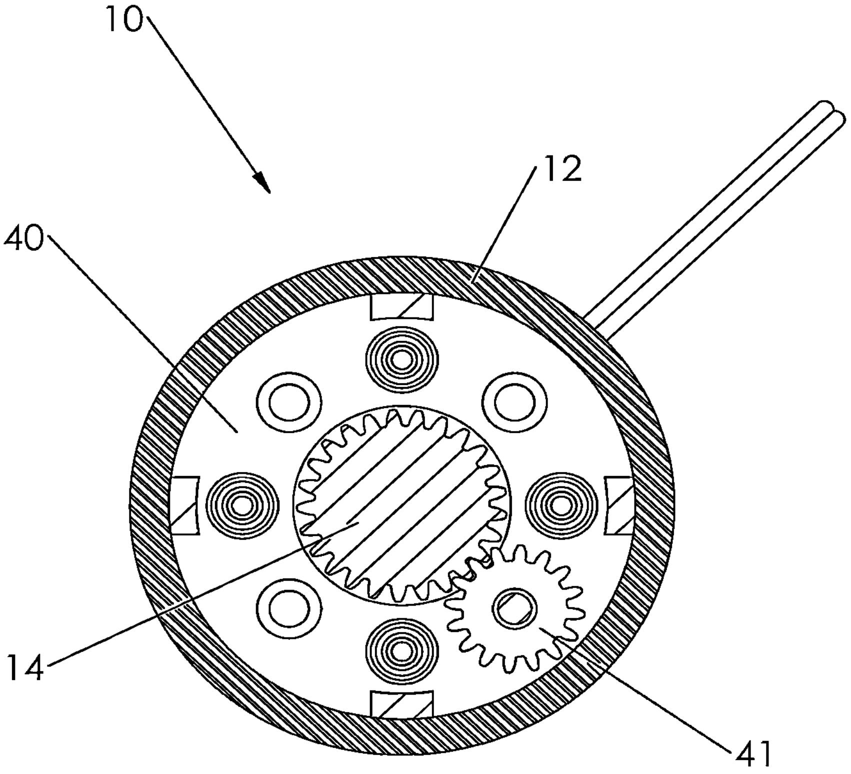

FIG. 5B illustrates a cross-sectional view a power actuator system 10 incorporating a parallel axis friction brake 40, the sectional view taken radially through parallel axis friction brake 40. Within parallel axis friction brake 40, friction assembly 41 is shown engaged with output screw 14, thereby providing a drag torque on its rotation. As evident in FIG. 5B, and as will be illustrated in further embodiments below, friction assembly 41 includes a shaft parallel to output screw 14 and an outer gear diameter that is a smaller diameter than output screw 14. Accordingly, the parallel shaft of friction assembly 41 rotates faster than output screw 14. This increases pressure within parallel axis friction brake 40 and enhances the operation of parallel axis friction brake 40.

Figure 6:
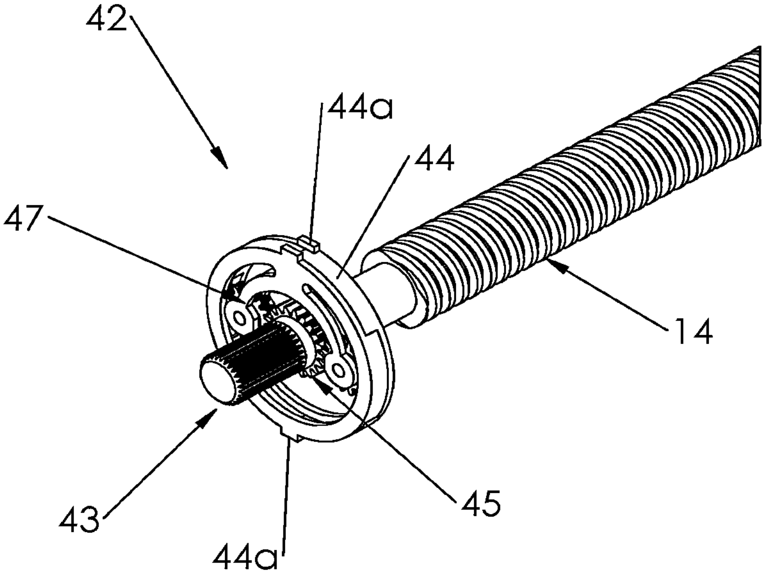
FIG. 6 illustrates a partial view of a power actuator system with some portions removed in accordance with one embodiment.

FIG. 6 illustrates a partial view of power actuator system 10, where portions are removed so that a parallel axis friction brake 42 and output screw 14 are more visible. In one embodiment, parallel axis friction brake 42 includes brake housing 44, housing tabs **44*a*, and friction assembly 47 contained therein. In one embodiment, output screw 14** includes spline end 43 and spur gear 45. In one embodiment, spur gear 45 is press fit onto output screw 14 and is configured to engage friction assembly 47. Accordingly, as output screw 14 is rotated, such as being driven by spline end 43 engaging components in gearbox 18, friction assembly 47 provides precise control drag on power actuator system 10 minimizing extra drag on motor 16. Accordingly, as output screw 14 is stationary but holding a load, such as being loaded by external forces through lead screw 14 (snow load, user applied forces, wind forces, gravitational loads from slopes), friction assembly 47 provides precise control drag on power actuator system 10 ensuring the system does not move unexpectedly.

Figure 7:
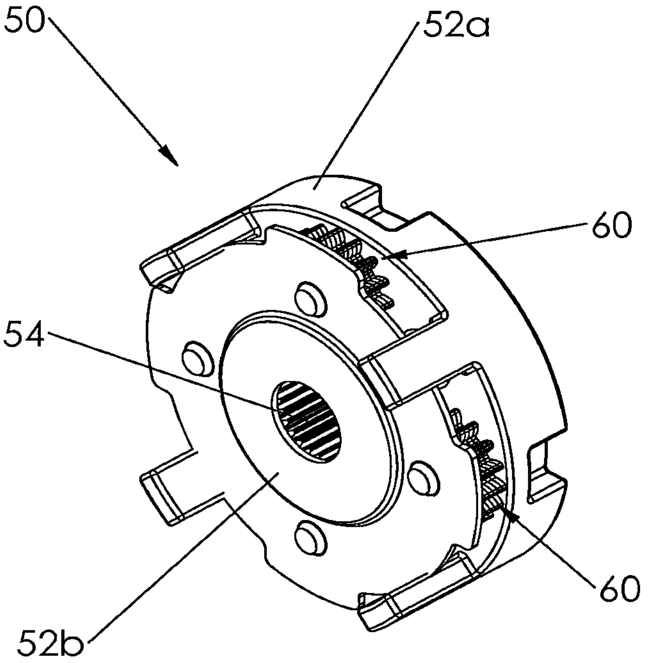
FIG. 7 illustrates a perspective view of a parallel axis friction brake in accordance with one embodiment.
Figure 8:
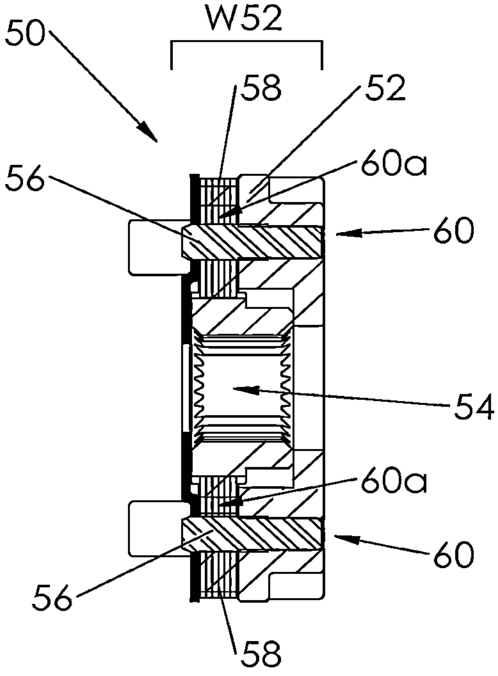
FIG. 8 illustrates a cross-sectional view of a parallel axis friction brake in accordance with one embodiment.
Figure 9:
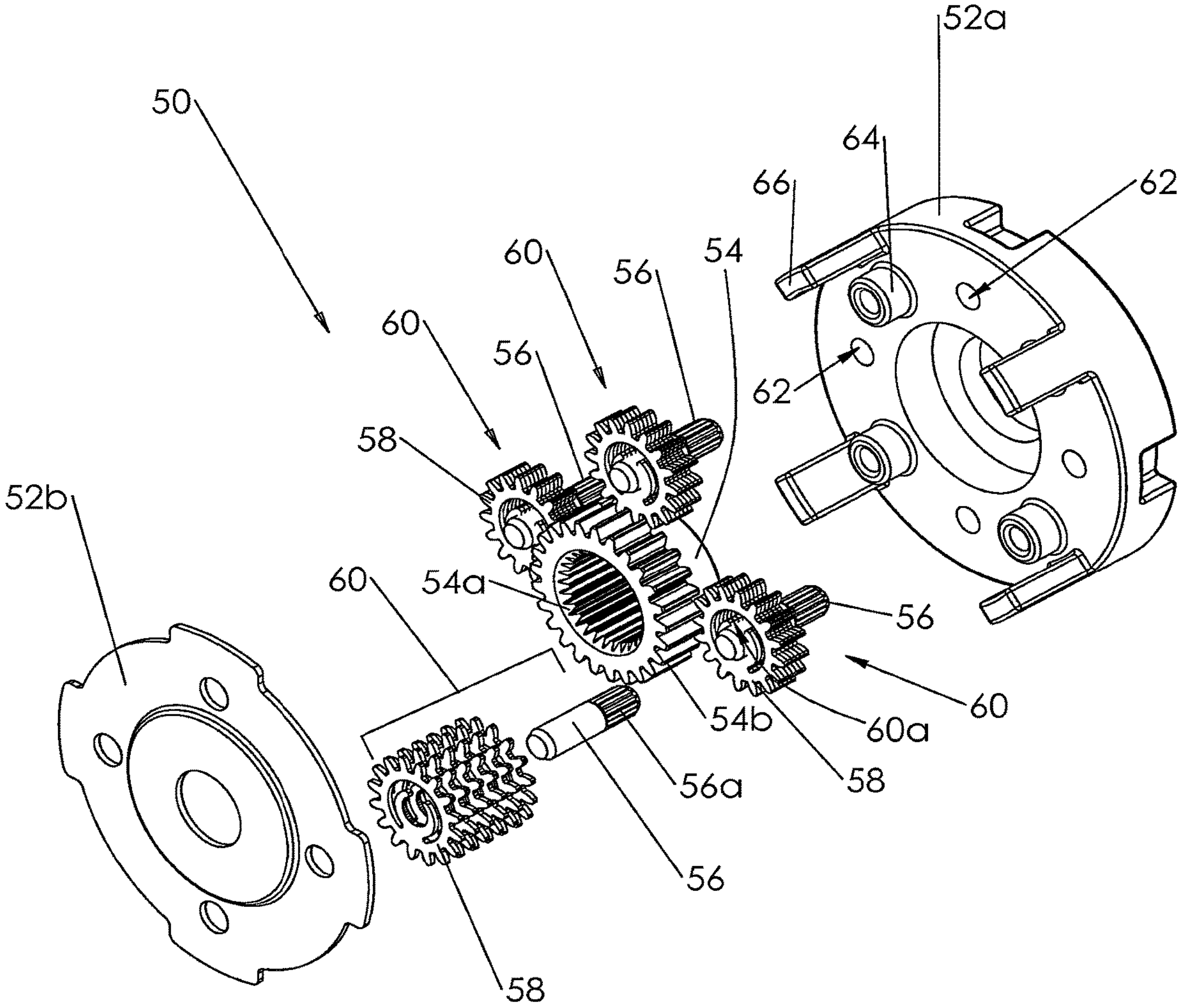
FIG. 9 illustrates an exploded view of a parallel axis friction brake in accordance with one embodiment.

FIGS. 7-9 illustrate parallel axis friction brake 50 in accordance with one embodiment. In one embodiment, parallel axis friction brake 50 includes first brake housing portion 52*a*, second brake housing portion 52*b*, center gear 54, parallel shaft 56, and ring clip 58. FIG. 7 illustrates a perspective view of parallel axis friction brake 50, which comprises first brake housing portion 52*a* and second brake housing portion 52*b*. FIG. 8 illustrates a cross sectional view of parallel axis friction brake 50 taken essentially along its center. FIG. 9 is an exploded view of parallel axis friction brake 50.

Parallel axis friction brake 50 is configured to be placed in a power actuator system 10, such as substituted in for parallel axis friction brake 40 in FIG. 5A or substituted in for friction brake 20 in FIG. 2. In operation, spline end 43 of output screw 14 engages center gear 54, which in one embedment has inner teeth 54*a* on its inner surface to engage the outer spline teeth of output screw 14. This causes the rotation of center gear 54 with the rotation of output screw 14. Center gear 54 also has outer gear teeth 54*b* on its outer surface that are configured to engage ring clip 58. Ring clip 58 is pressed over parallel shaft 56 in an interference fit together forming friction assembly 60. In one embodiment, parallel shaft 56 has a knurled end 56*a* (see, FIG. 9) that press fits into brake housing opening 62 so that parallel shaft 56 is fixed to brake housing 52. Because parallel shaft 56 is fixed to brake housing 52, rotation of ring clip 58 over parallel shaft 56, with the rotation of center gear 54 and output screw 14, provides precise control drag on the system by parallel axis friction brake 50.

In one embodiment, brake housing 52 is configured with tabs 66, which allow brake housing 52 to be secured to actuator housing 12. In one embodiment, tabs 66 extend perpendicularly from first brake housing portion 52*a* such that they couple to gearbox 18, which in turn is secured to actuator housing 12 (see, FIG. 5A). In another embodiment, housing tabs 44*a* (see, FIG. 6) can extend radially from brake housing 44 such that they directly secure brake housing 44 to actuator housing 12, such that they are prevented from relative rotation.

In one embodiment, parallel shaft 56 of friction assembly 60 is oriented within brake housing 52 such that it is parallel with center gear 54, but radially offset from center gear 54. FIG. 8 illustrates parallel axis friction brake 50 including two friction assemblies 60, one above and one below center gear 54, as oriented in the figure. Accordingly, parallel shafts 56 are parallel to center gear 54. In one embodiment, friction assembly 60 includes friction assembly lubricant 60*a*, which surrounds parallel shaft 56 and ring clip 58.

FIG. 9 illustrates four friction assemblies 60 mounted within parallel axis friction brake 50. More or less friction assemblies can be used. Also in FIG. 9, each of friction assemblies 60 include a plurality of ring clips 58. Both the number of ring clips 58 used within each friction assembly 60, and the number of friction assemblies 60 used in parallel axis friction brake 50 are proportional to the amount of drag on the system provided by parallel axis friction brake 50. Accordingly, both the number of ring clips 58 and friction assemblies 60 used can be tailored according to the required drag for a given application.

One advantage of utilizing friction assemblies parallel to and offset from center gear 54, is providing excellent drag torque characteristics in relatively short axial profile. Where certain applications offer very restricted space, having a short axial length is advantageous. In one embodiment, adequate drag can be generated by parallel axis friction brake 50 with a single friction assembly 60. In such a single friction assembly 60 configuration, however, a plurality of ring clips 58 will likely be needed in order to generate the required drag torque. Using a large number of ring clips 58 will increase the overall width $W_{52}$ required for brake housing 52 to accommodate a large number of ring clips 58. In one embodiment, a larger drag torque can be generated by using 2, 4 or even more friction assemblies 60, but also then using lower number of ring clips 58. As such, the axial length can be limited, minimizing the overall width $W_{52}$ required for brake housing 52. Using a plurality of friction assemblies 60 within the circumferential space available outside the center gear 54 and within brake housing 52 minimizes the length required within power actuator system 10 to provide the drag function.

Figure 10:
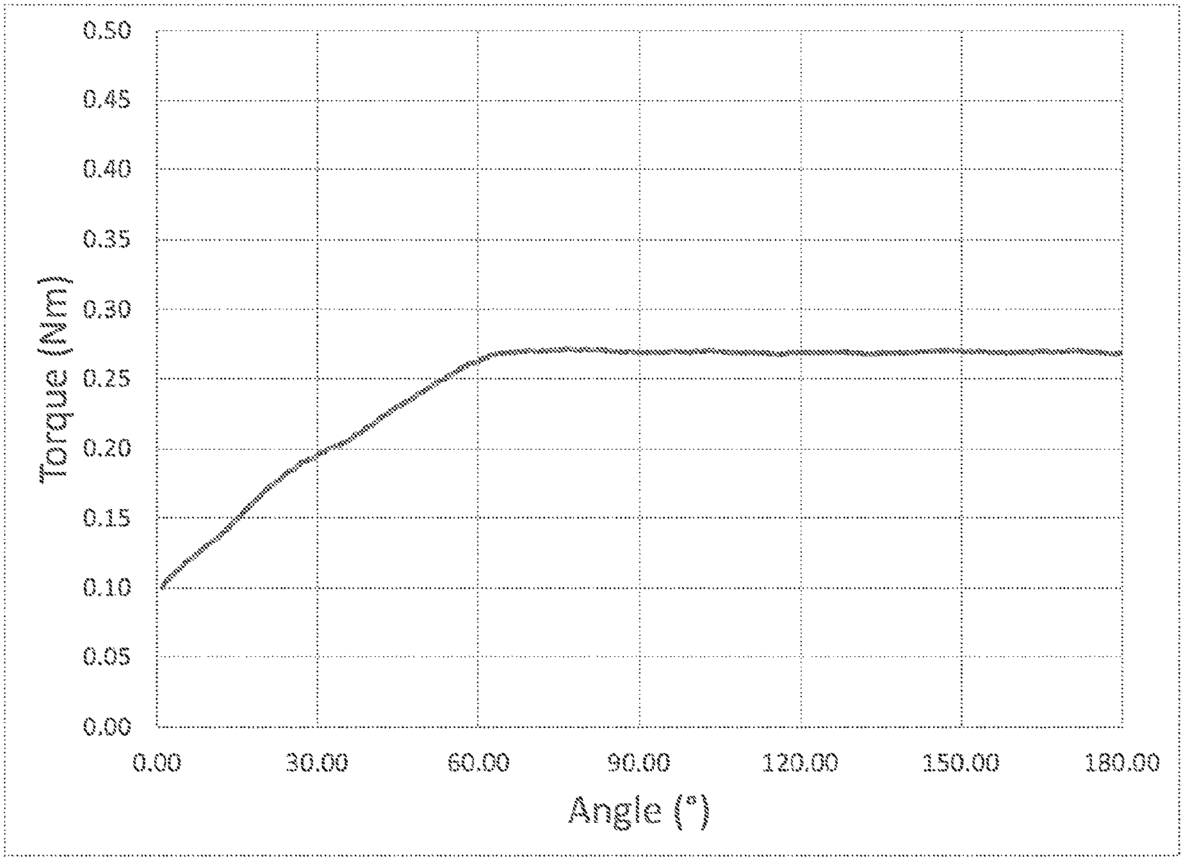
FIG. 10 illustrates torque produced as a function of angle for a parallel axis friction brake in accordance with one embodiment.

Generating drag torque using the relatively smaller diameter shaft of the friction assemblies, compared with the relatively larger diameter output screw 14 and center gear 54, creates higher pressure than previous designs. Surprisingly, however, it also greatly improves stick-slip performance. FIG. 10 illustrates the torque produced in parallel axis friction brake 50 as a function of angle as center gear 54 and output screw 14 rotate. Parallel axis friction brake 50 was evaluated with the same test system as was used for friction brake 20, results of which were in FIG. 4. At the beginning of the test, the compliant element is being loaded up to the static torque of the parallel axis friction brake 50 under test with no relative motion of the brake. Then once the static torque is met relative motion starts, this is the same as the prior testing. In this case, due to the characteristics and performance of parallel axis friction brake 50 it begins rotating without showing any stick-slip. As is evident, the design virtually eliminates stick-slip and provides a relatively smooth drag torque profile.

Figure 11:
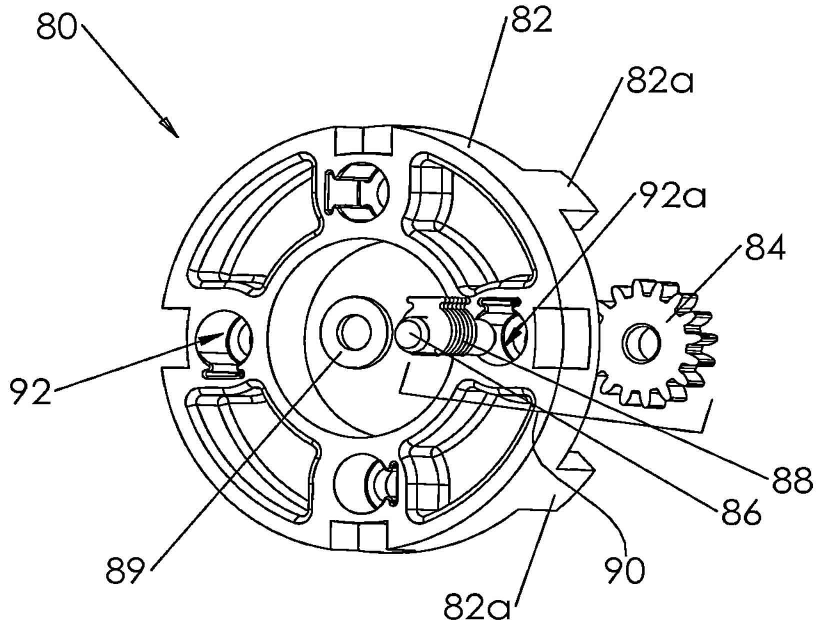
FIG. 11 illustrates a parallel axis friction brake in accordance with one embodiment.
Figure 12:
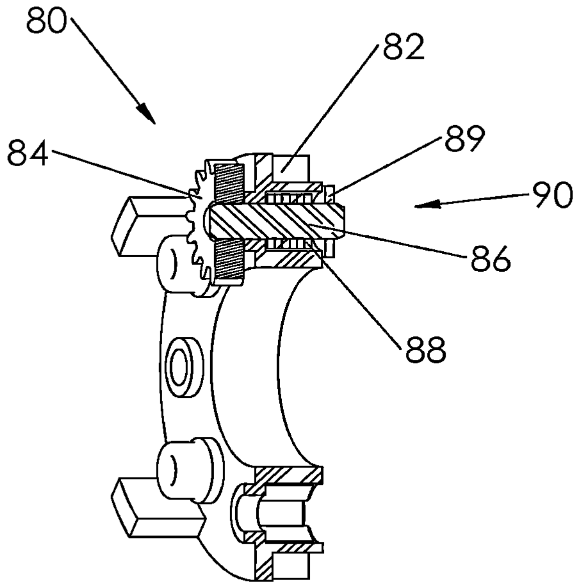
FIG. 12 illustrates a cross-sectional view of a parallel axis friction brake in accordance with one embodiment.

FIGS. 11-12 illustrate parallel axis friction brake 80 in accordance with one embodiment. In one embodiment, parallel axis friction brake 80 includes brake housing 82 and friction assembly 90. Friction assembly 90 includes friction gear 84, parallel shaft 86, clips 88 and retaining ring 89. Friction gear 84 is fixed over parallel shaft 86 such that they rotate together. Clips 88 are pressed over parallel shaft 86 in an interference fit, such that they can rotate relative to each other under friction. Retaining ring 89 is pressed over parallel shaft 86 to axially secure friction assembly 90 to housing 82. Lubricant 92*a* can be placed within clip slot 92 to ensure adequate lubrication within friction assembly 90. Parallel axis friction brake 80 operates highly similarly to parallel axis friction brake 50 described above, and can be placed in power actuator system 10 (such as for parallel axis friction brake 40 in FIG. 5A or for friction brake 20 in FIG. 2) to provide a similar drag torque characteristic.

In operation, a drive gear, such as center gear 54 above, engages friction gear 84, such that friction gear rotates with center gear 54 and output screw 14. Clips 88 are placed within clip slot 92 of brake housing 82. Clip slot 92 is shaped to match the outer profile of clips 88, such that clips 88 cannot rotate and are fixed relative to brake housing 82. As such, when parallel shaft 86 and friction gear 84 are rotated within clips 88, which are held by brake housing 82, friction assembly 90 provides precise control drag on power actuator system 10.

In one embodiment, brake housing 82 is configured with tabs 82*a*, which allow brake housing 82 to be secured to actuator housing 12 via gearbox 18. In one embodiment, tabs can extend radially from the outer circumference of the brake housing, rather than axially. For example, tabs 44*a* extend radially from the outer circumference of the brake housing 44 (see, FIG. 6), such that they couple to actuator housing 12, and are prevented from relative rotation.

In one embodiment, similar to parallel axis friction brake 50 described above, parallel axis friction brake 80 also allows for a single friction assembly 90 to be used, or as illustrated in FIG. 11, four clip slots 92 are provided for additional friction assemblies 90. More than four friction assemblies 90 can be used as well. In addition, more or less clips 88 can be used. As with parallel axis friction brake 50, using more friction assemblies 90 and fewer clips 88 will help to limit the radial length of friction brake housing 82, allowing its use in relatively compact designs.

As evident from parallel axis friction brakes 50 and 80, different friction elements can be used for friction assembly 60 (ring clips 58) and friction assembly 90 (clips 88). Other types of friction elements than ring clips 58 and clips 88 can be placed over parallel shafts 56 and 86 to generate the required torque. For example, sheet metal bands can be wrapped about the parallel shafts to create friction assembles within alternative parallel axis friction brakes. Friction assemblies within the claimed parallel axis friction brakes provides a relatively smooth drag torque profile without using additional springs or requiring electromechanical actuators.

Figure 13:
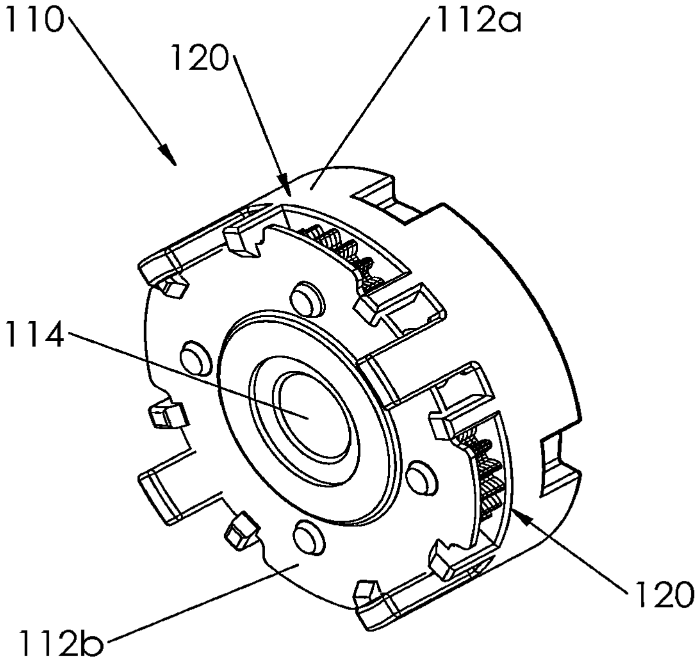
FIG. 13 illustrates a perspective view of a parallel axis friction brake with a roller clutch bearing in accordance with one embodiment.
Figure 14A:
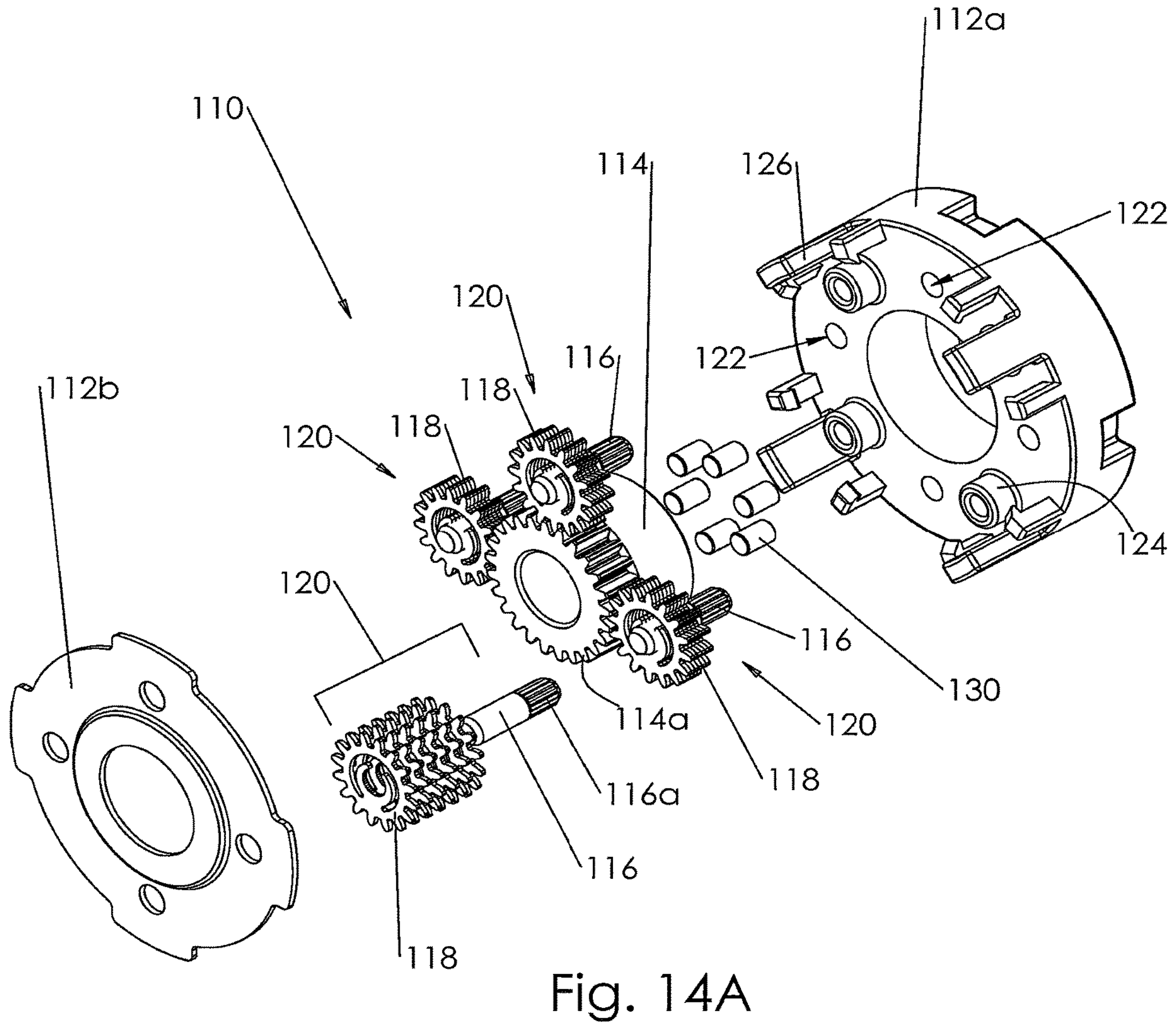
FIGS. 14A-14B illustrate exploded views of a parallel axis friction brake with a roller clutch bearing in accordance with one embodiment.
Figure 14B:
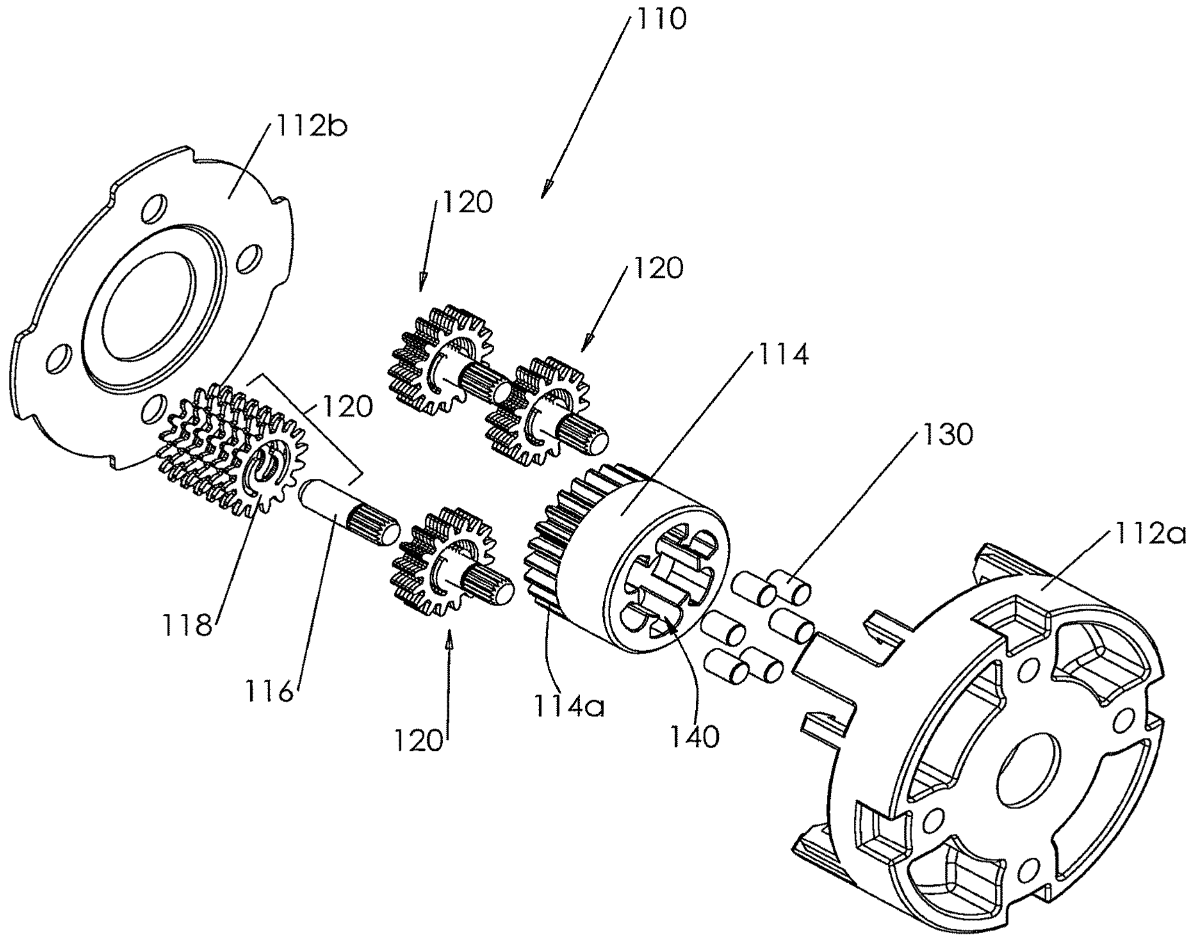
Figure 15:
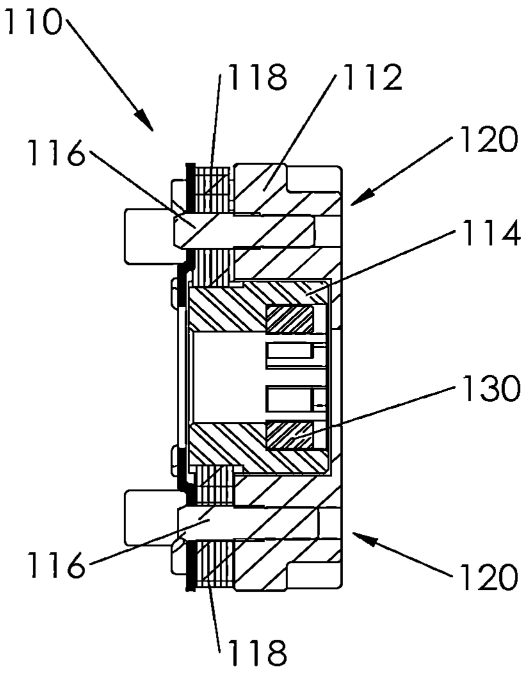
FIG. 15 illustrates a cross-sectional view of a parallel axis friction brake with a roller clutch bearing in accordance with one embodiment

FIGS. 13-15 illustrate one-way parallel axis friction brake 110 in accordance with one embodiment. In one embodiment, one-way parallel axis friction brake 110 includes first brake housing portion 112*a*, second brake housing portion 112*b*, center gear 114, and friction assembly 120. Friction assembly 120 includes parallel shaft 116, and ring clips 118. Center gear 114 includes gear teeth 114*a* and is further provided with slots 140 configured to receive rollers 130.

FIG. 13 illustrates a perspective view of one-way parallel axis friction brake 110, which comprises first brake housing portion 112*a* and second brake housing portion 112*b*. FIGS. 14A and 14B are exploded views of one-way parallel axis friction brake 110, with FIG. 14B being reversed relative to FIG. 14A to show both sides. FIG. 15 illustrates a cross sectional view of one-way parallel axis friction brake 110 taken essentially along its center.

One-way parallel axis friction brake 110 operates highly similarly to parallel axis friction brakes 50 and 80 described above, and can be placed in power actuator system 10 (such as for parallel axis friction brake 40 in FIG. 5A or for friction brake 20 in FIG. 2) to provide a similar drag torque characteristic. In addition, one-way parallel axis friction brake 110 provides one-way clutch function such that rotation in one direction engages friction assemblies 120, while rotation in the opposite direction bypassing the friction assemblies.

When coupled to a drive mechanism, such as output screw 14 in power actuator system 10, connection is simple and only requires a plain cylinder on the lead screw/actuator drive shaft to connect with the one-way mechanism. With these added components the drag brake becomes uni-directional—with near zero drag in one direction of rotation.

Other embodiments are also possible, such as one-way clutches/bearings that use balls, wrap springs or sprags that would also perform the same function and can also be combined with the various embodiments of parallel axis friction brakes described herein. Combining the drag brake with a one way is desirable in some actuators when the added drag is only needed in one direction-typically associated with gravitational loads on lids/gates. These directionally dependent clutch functions can be added without major changes to the overall footprint. These mechanisms can remain small since they must transmit only the known precise brake load.

Figure 16:
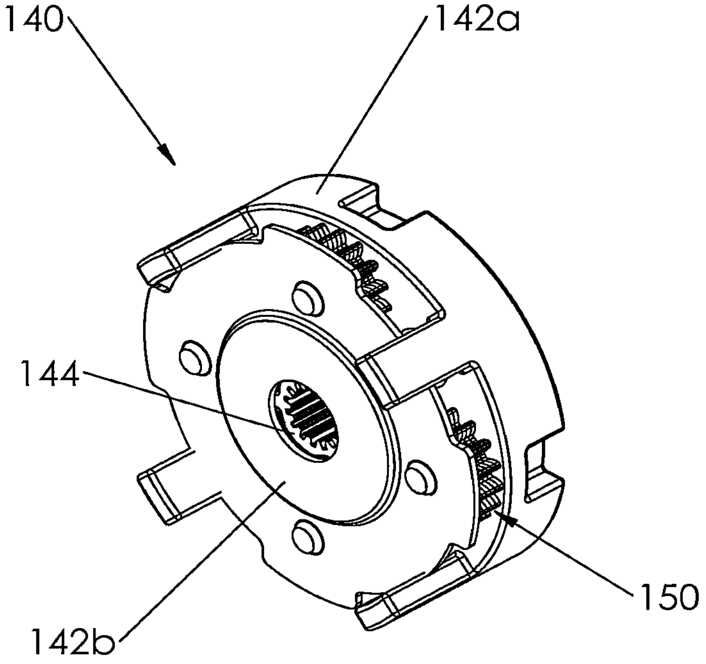
FIG. 16 illustrates a perspective view of a parallel axis friction brake with an anti-back-drive clutch in accordance with one embodiment.
Figure 17:
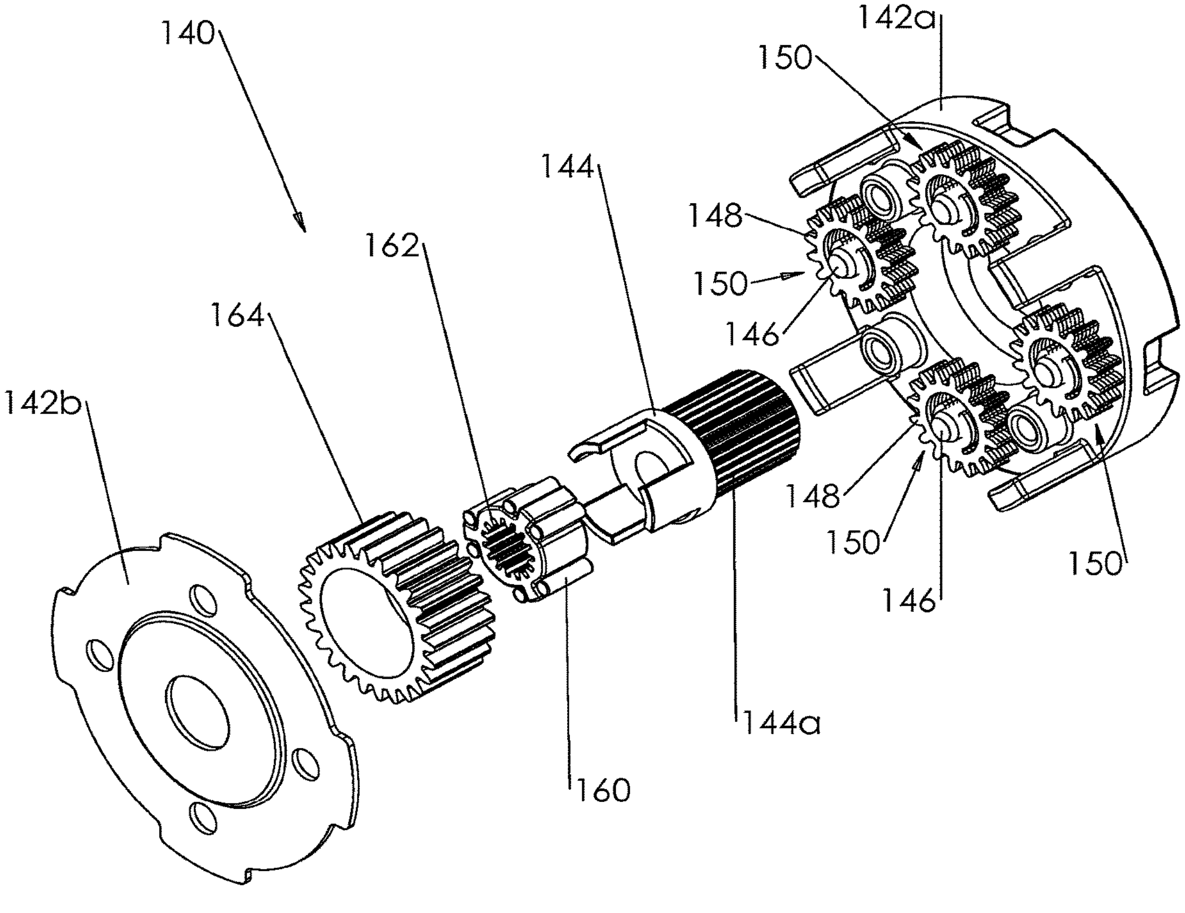
FIG. 17 illustrates an exploded view of a parallel axis friction brake with an anti-back-drive clutch in accordance with one embodiment.
Figure 18:
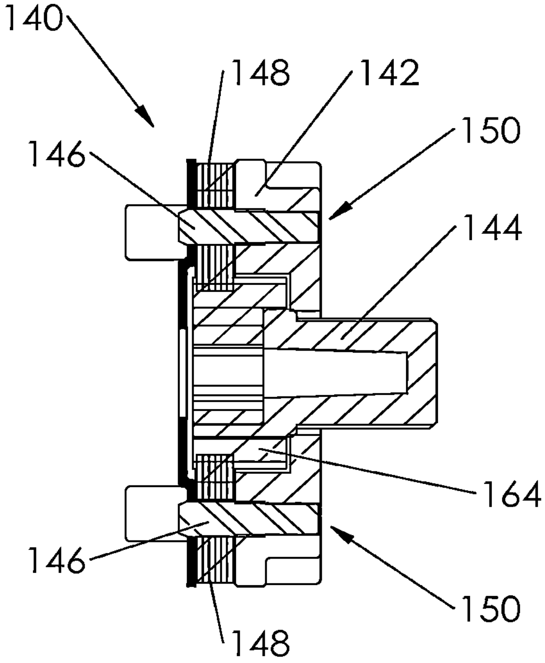
FIG. 18 illustrates a cross-sectional view of a parallel axis friction brake with an anti-back-drive clutch in accordance with one embodiment

FIGS. 16-18 illustrate anti-back-drive parallel axis friction brake 140 in accordance with one embodiment. In one embodiment, anti-back-drive parallel axis friction brake 140 includes first brake housing portion 142*a*, second brake housing portion 142*b*, input spline 144, output hub 162, center gear 164, and friction assembly 150. Friction assembly 150 includes parallel shaft 146, and ring clips 148. Center gear 164 includes gear teeth on its outer surface for engaging friction assemblies 150. Output hub 162 includes rollers 160 and spline teeth on its inner surface. Input spline has outer teeth 144*a*.

FIG. 16 illustrates a perspective view of anti-back-drive parallel axis friction brake 140, which comprises first brake housing portion 142*a* and second brake housing portion 142*b*. FIG. 17 is an exploded view of anti-back-drive parallel axis friction brake 140, FIG. 18 illustrates a cross sectional view of anti-back-drive parallel axis friction brake 140 taken essentially along its center.

Anti-back-drive parallel axis friction brake 140 operates highly similarly to parallel axis friction brakes 50 and 80 described above, and can be placed in power actuator system 10 (such as for parallel axis friction brake 40 in FIG. 5A or for friction brake 20 in FIG. 2) to provide a similar drag torque characteristic. In addition, anti-back-drive parallel axis friction brake 140 provides anti-back-drive clutch function such that friction assemblies 150 are bypassed when a motor, such as motor 16 in power actuator system 10 is driving outer teeth 144*a* of input spline 144 in either clockwise or counter clockwise directions. Alternatively, friction assemblies 150 are engaged when spline teeth on the inner surface of output hub 162 are engaged by an output load through output screw 14 in either clockwise or counter clockwise directions.

There are other known ways to package a roller anti-back-drive. There are other known anti-back-drives (no-back or anti-back-drive mechanisms) that use wrap springs or other features that also perform the same function. The combination of the various embodiments of parallel axis friction brakes described herein and anti-back-drive mechanism is desirable in some actuators when motor sizing or power consumption is critical.

Although automotive actuators were used as a known example for the present embodiments of this invention; it can serve many other applications where precise drag torque in a small package space is needed, particularly if stick-slip is of a concern.

Figure 19:
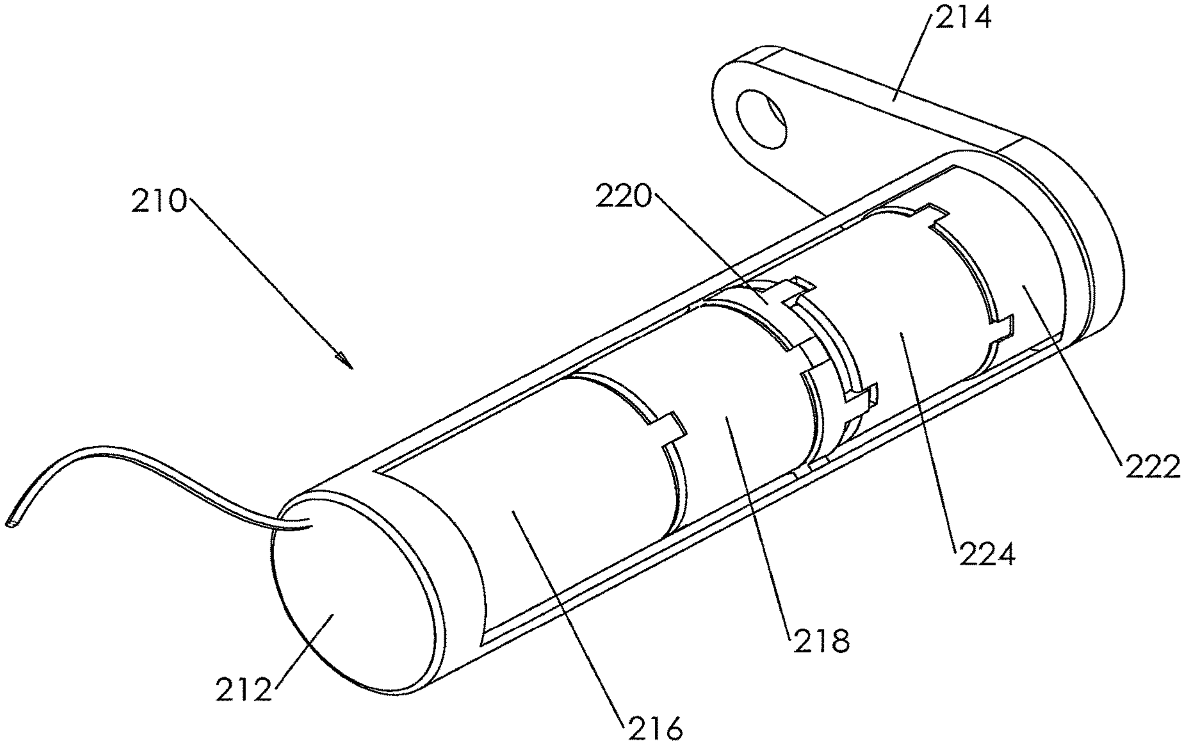
FIGS. 19-21 illustrate a power actuator system incorporating a parallel axis friction brake in accordance with one embodiment.
Figure 20:
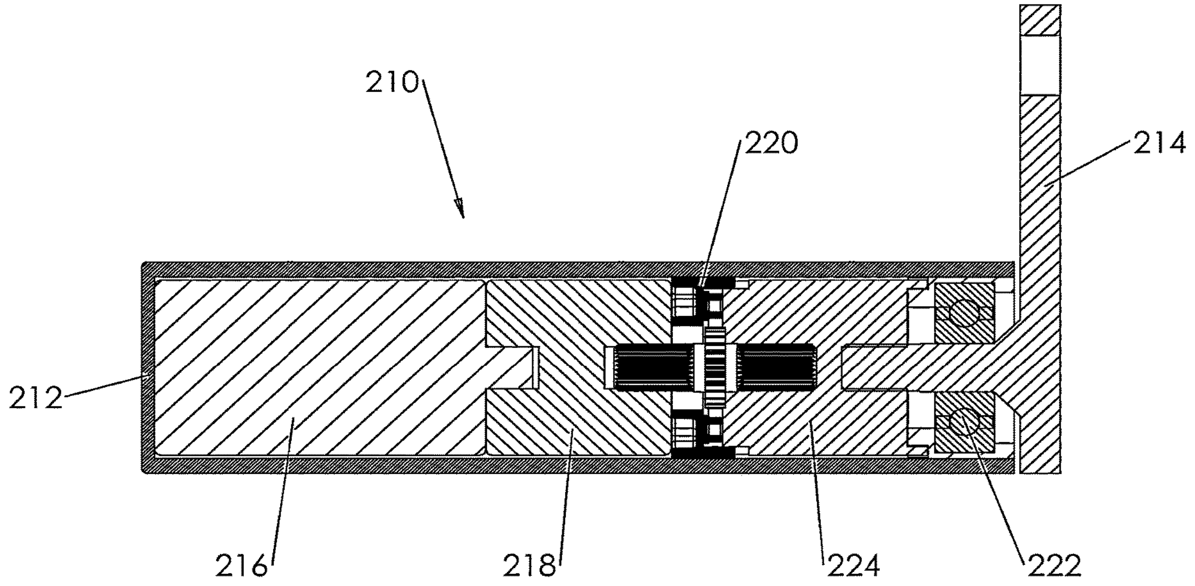
Figure 21:
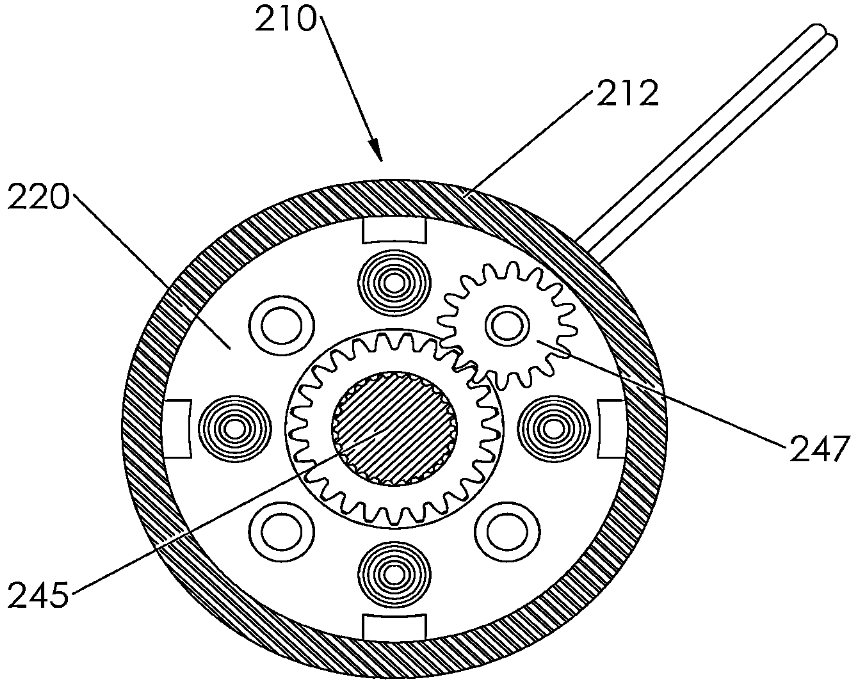

FIGS. 19-21 illustrated a direct drive power actuator system 210, incorporating a parallel axis friction brake 220 in accordance with one embodiment. As indicated, the various embodiments of parallel axis friction brakes described herein can be used in various drive systems, including spindle drive systems, and can also be used in direct drive systems, and other applications.

In one embodiment, direct drive power actuator system 210 includes actuator housing 212, motor 216, first gearbox 218, parallel axis friction brake 220, second gearbox 224, bearing support 222, and hinge drive 214. Rather than drive an output screw like the spindle drive systems above, direct drive power actuator system 210 directly drives hinge drive 214 using gear ratios within first and second gearboxes 218 and 224. Hinge drive 214 can be attached to a load, such as a gate or door, to open and close.

Parallel axis friction brake 220 is used just as the various embodiments of parallel axis friction brakes described herein to provide precise control drag on power actuator system 210. Parallel axis friction brake 220 includes a friction assembly 247, including a shaft on an axis parallel to drive mechanism 245, to generate the drag torque, as previously described.

Although gear embodiments are illustrated herein, other applications for the variously described embodiments of parallel axis friction brakes are possible. Additional options could include using a spline like a gear to allow easier integration with a spline shaft for connection to gearbox, driving through belts or chains or other mechanical connections. Shown in these embodiments are gear connections where the brake rotates at a higher speed than the central gear/drive shaft. Other speed ratios are possible and still fit within the scope of this invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A parallel axis friction brake coupled to a rotatable drive shaft, the parallel axis friction brake comprising:
- a brake housing; and
- a friction assembly comprising:
  - at least one shaft parallel to the rotatable drive shaft; and
- at least one friction clip pressed over the at least one parallel shaft in an interference fit;
- wherein the friction assembly is engaged with the drive shaft and coupled between the brake housing and the rotatable drive shaft, at least one of the at least one friction clips and the at least one parallel shaft rotating with rotation of the rotatable drive shaft to produce the drag force; and
- wherein the friction assembly further comprises a lubricant.

2. The parallel axis friction brake of claim 1, wherein the rotatable drive shaft is coupled to one of a lead screw spindle drive and a direct drive that are fixed to a load that is moved by the lead screw spindle drive or direct drive.

3. The parallel axis friction brake of claim 1, wherein the parallel axis friction brake further comprises a one-way device such that the parallel axis friction brake is engaged for one direction of rotation of rotatable drive shaft and is disengaged for an opposite direction of rotation of rotatable drive shaft.

4. The parallel axis friction brake of claim 1 further comprising a motor and a clutch such that the parallel axis friction brake is disengaged when the motor is driving the rotatable drive shaft and is engaged when an output engages the power actuator system.

5. The parallel axis friction brake of claim 1, wherein the friction assembly further comprises a portion with gear teeth having an outer diameter that is smaller than an outer diameter of the rotatable drive shaft, the gear teeth engages with the rotatable drive shaft such that the friction assembly rotates faster than the rotatable drive shaft.

6. The parallel axis friction brake of claim 1, wherein the friction assembly is characterized by the absence of separate springs and magnetic actuators.

7. The parallel axis friction brake of claim 1 further comprising a motor, wherein the rotatable drive shaft is driven by the motor.

8. The parallel axis friction brake of claim 1, wherein the at least one friction clip further comprises a portion with gear teeth having an outer diameter that is smaller than an outer diameter of the rotatable drive shaft, the gear teeth engaging with the rotatable drive shaft such that the friction assembly rotates faster than the rotatable drive shaft.

9. An actuator system comprising:
- a rotatable drive shaft;
- a parallel axis friction brake engaged with the drive shaft and configured to provide a drag force on the rotatable drive shaft, the parallel axis friction brake further comprising:
  - a brake housing; and
  - a friction assembly comprising at least one parallel axis shaft and at least one clip pressed over the at least one parallel shaft in an interference fit;
- wherein the friction assembly is engaged with the drive shaft and coupled to the brake housing, at least a portion of the friction assembly rotating with the rotatable drive shaft to create the drag force; and
- wherein the friction assembly further comprises a lubricant.

10. The actuator system of claim 9 further comprising:
- an actuator housing;
- wherein the rotatable drive shaft is at least partially contained within the actuator housing; and
- wherein the brake housing is coupled to the actuator housing.

11. The actuator system of claim 10, wherein the friction assembly is rotatably engaged with the drive shaft and is coupled between the brake housing and the rotatable drive shaft.

12. The actuator system of claim 9, wherein the actuator system is coupled to a vehicle between a stationary first component and a moveable second component and wherein the rotatable drive shaft is coupled to one of a lead screw spindle drive linear actuator and a direct drive rotary actuator that are fixed to the moveable second component such that the moveable second component is moved by the lead screw spindle drive or by the direct drive.

13. The actuator system of claim 9, wherein the parallel axis friction brake further comprises a one-way device such that the parallel axis friction brake is engaged for one direction of rotation of rotatable drive shaft and is disengaged for an opposite direction of rotation of rotatable drive shaft.

14. The actuator system of claim 9 further comprising a motor and a clutch such that the parallel axis friction brake is disengaged when the motor is driving the rotatable drive shaft and is engaged when an output engages the power actuator system or such that the parallel axis friction brake is engaged when the motor is driving the rotatable drive shaft and is disengaged when an output engages the power actuator system.

15. The actuator system of claim 9, wherein the friction assembly further comprises a portion with gear teeth having an outer diameter that is smaller than an outer diameter of the rotatable drive shaft, the gear teeth engages with the rotatable drive shaft such that the friction assembly rotates faster than the rotatable drive shaft.

16. The actuator system of claim 9, wherein the friction assembly is characterized by the absence of separate springs and magnetic actuators.

* * * * *